United States Patent [19]
Tsan

[11] Patent Number: 6,024,367
[45] Date of Patent: Feb. 15, 2000

[54] ECCENTRIC DEVICE FOR GEAR SET OF BICYCLE

[76] Inventor: Hsi-Tsuan Tsan, No. 3, Alley 169, Lane Guang-Yun, Guang-Yun Ts'un, Yeong-Jing Hsiang, Chang-Hua Hsien, Taiwan

[21] Appl. No.: 08/970,138

[22] Filed: Nov. 14, 1997

[51] Int. Cl.[7] .................................................. B62M 1/00
[52] U.S. Cl. .......................................................... 280/229
[58] Field of Search ...................... 192/217.3; 188/24.11; 280/160, 159, 229

[56] References Cited

U.S. PATENT DOCUMENTS

| | | | |
|---|---|---|---|
| 3,831,977 | 8/1974 | Osborne et al. | 280/229 |
| 4,162,084 | 7/1979 | Mikina | 280/229 |
| 4,755,005 | 7/1988 | Tsai | 301/1 |

*Primary Examiner*—Robert J. Oberleitner
*Assistant Examiner*—Daniel Yeagley
*Attorney, Agent, or Firm*—Donald C. Casey, Esq.

[57] ABSTRACT

An eccentric device of a gear set of a bicycle is described. The device includes a braking disk, a transmission gears set, an eccentric shaft set and a hub assembly. The eccentric shaft set is disposed within the hub assembly and can be rotated with respect to the hub assembly. When the eccentric shaft is located at the center of the hub assembly the hub assembly can be readily rotated by the flywheel. When the braking disk is braked, the eccentric shafts set can be rotated with respect to the hub assembly through the transmission gears set. The shifting effect is thereby attained. The shifting displacement can be readily controlled by the braking time of the braking disk. When the braking disk is released the hub assembly can be readily rotated as centered on the eccentric shafts. The rear wheel will be oscillated upward and downward when it is rotated.

1 Claim, 5 Drawing Sheets

ECCENTRIC DEVICE FOR GEAR SET OF BICYCLE

FIELD OF THE INVENTION

The present invention relates to an eccentric device of the gear set of bicycle of the type which includes a braking disk a transmission gears set, an eccentric shafts set, and a hub assembly. The eccentric shaft is disposed within the hub assembly and it can be rotated by the flywheel. The braking disk can be stopped to adjust the shifting position of the eccentric shaft by the transmission gears set that are rotated counterclockwise. Accordingly, the bicycle can be operated in a normal mode or a shifted mode.

DESCRIPTION OF PRIOR ART

Resting on Saturday and Sunday has become a new trend as our living standard has upgraded days by days. The contents of our leisure have become more and more important. As a result a plurality of products, which the user may take an exercise has been provided.

In light of this bicycle is not merely a transportation tool but also an exercising facility. Conventionally the bicycle shall be featured with its performance as well as efficiency or the capability of riding over the off-road. No doubt, the existing bicycle may meet the requirement on riding on the mountain or merely travel. Nevertheless, using the bicycle to get an entertainment and amusement has not been included in the design. Even there is some bicycle designed for sporting, it has been focused on strengthen the muscle and its durability. On the other hand this kind of exercising bicycle is fixedly disposed. The user can not get any amusement therefrom.

SUMMARY OF THE INVENTION

It is the objective of this invention to provide an eccentric device for the gear set of the bicycle with which the bicycle can be conveniently operated between normal mode or shifted mode.

The present invention relates to an eccentric device of the gear set of bicycle of the type which includes a braking disk in which an eccentric shaft is mounted. It includes a bushing and a shaft. A pair of eccentric gears is enveloped externally. The eccentric gears are engaged with another hub assembly. A transmission gear set is provided and it includes a first, second and third pinions that are interconnected with each other. The third pinion is fixedly attached to the braking disk. The other end of the transmission gear set is coupled through a hub assembly by means of a driving rod. A pair of driving gears is enveloped thereon. Wherein when the eccentric gear of the eccentric shaft is rotated by the flywheel, the ratchet wheel of the outer eccentric gear is rotated by the driving gear through the driving rod. Then the hub being rotated, the transmission gears set that engaged with the driving gears is also rotated by means of the driving rod. The second pinion and the third pinion then the braking disk being rotated as normal wheel. Wherein when the braking disk is stopped, the third pinion being forcibly rotated around the bushing. Meanwhile, the outer eccentric gear being rotated counterclockwise by the driving gears the ratchet wheel being also rotated counterclockwise respect to the hub, and a shifting displacement is attained. The shifting displacement can be readily controlled by the braking time to the braking disk. Wherein when the braking disk is released, the rear wheel that attached to the enclosing hub by means of spokes is rotated as centered on the eccentric shaft. Accordingly, the rear wheel will be oscillated upward and downward when it is rotated. The present invention can be readily shifted between the normal or shifted modes. The shifting displacement can be readily adjusted.

DETAILED DESCRIPTION OF PREFERRED EMBODIMENTS

Figure 1A:
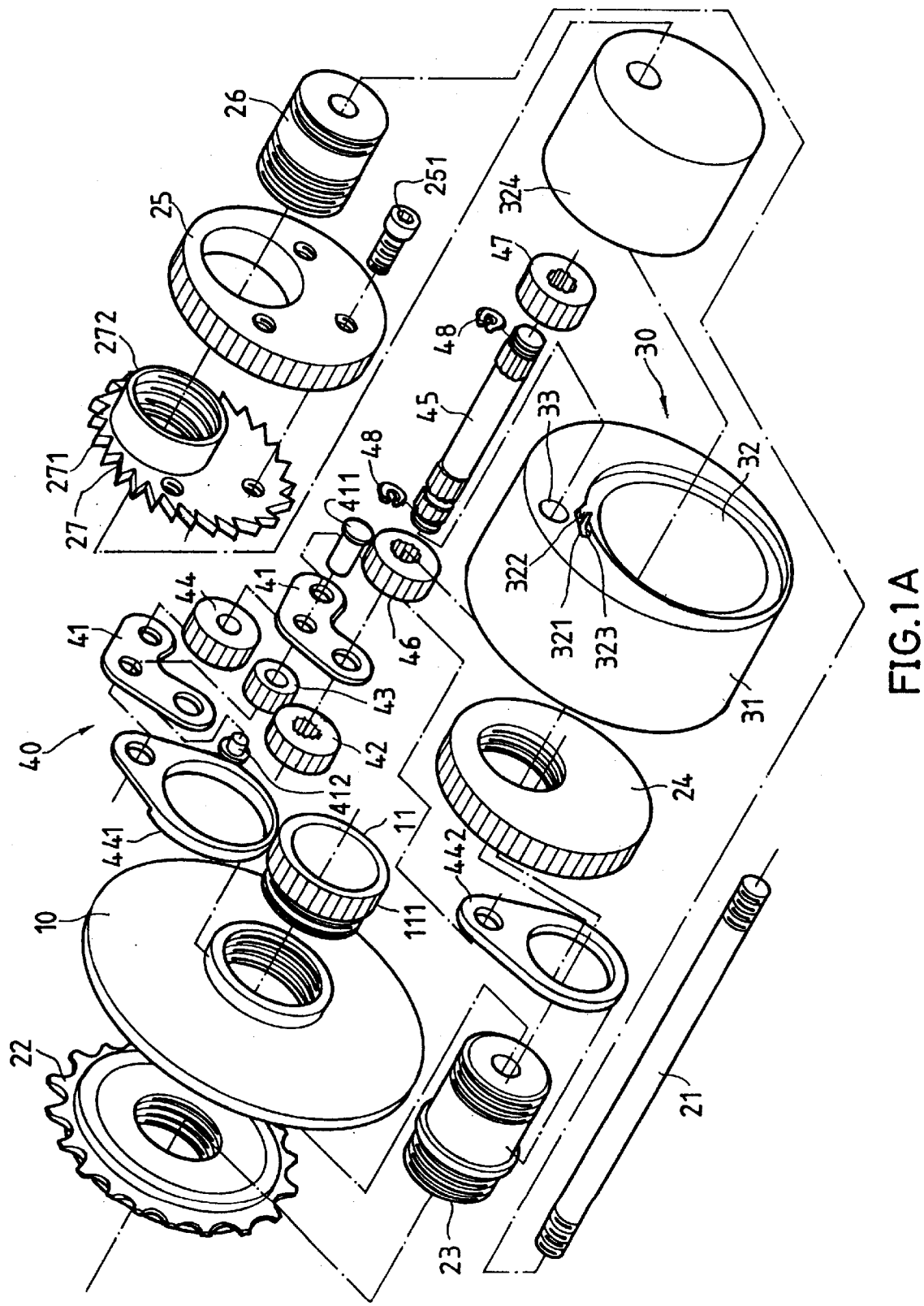
FIGS. 1A and 1B are the exploded perspective view and assembled view of the gear set made according of the present invention.

Referring to FIG. 1A, the eccentric device for the gear set of bicycle generally comprises the following components and the functions and relative relationship will be detailedly described as follow.

A braking disk 10 has a round shape. A bushing 11 is fixedly locked to the center of the braking disk 10. The perimeter of the braking disk 10 is provided with teeth 111. The bushing 11 has a smooth inner surface and an inner sleeve 23 can be rotationally mounted therein.

An eccentric shafts set 20 is comprised and it generally comprises the following components.

A main shaft 21 is fixedly attached to the front and rear forks. The main shaft 21 is provided with a flywheel 22 an inner sleeve 23, an inner eccentric gear 24, a hub assembly 30, an external eccentric gear 25, and an outer sleeve 26 orderly. Each of those components can be rotated about the main shaft 21.

One end of the inner sleeve 23 is fixedly attached with a fly wheel 22 and the second end of the inner sleeve 23 is attached to the inner eccentric gear 24. The thread portions of the inner sleeve 23 are opposite to each other. By this arrangement, the inner eccentric gear 24 can be prevented from loosening when the flywheel 22 is rotated. On the other hand, the outer sleeve 26 is fixedly attached to the eccentric sleeve 272 of the ratchet wheel 27.

Wherein the outer eccentric sleeve 26 is mounted with a ratchet wheel 27 and the outer portion of the ratchet wheel 27 is provided with a section of ratchet 271. The ratchet wheel 27 further includes an eccentric sleeve 272, which extends through the eccentric gear 25. The ratchet wheel 27 is fixedly locked to the eccentric gear 25, by screw 251.

A hub assembly 30 is provided and it comprises the following components.

A hub 31 is provided and it has a tubular configuration. The hub 31 includes an eccentric hole 32 in which a sleeve 324 is mounted. The hub 31 is further provided with a driving hole 33 at suitable position. The outer peripheral of the eccentric hole 32 is provided with a recess 321 in which a spring 322 and biasing tab 323. The biasing tab 323 can be engaged with the ratchet 271 of the ratchet wheel 27. Accordingly, it can be rotated along only one direction.

Figure 1B:
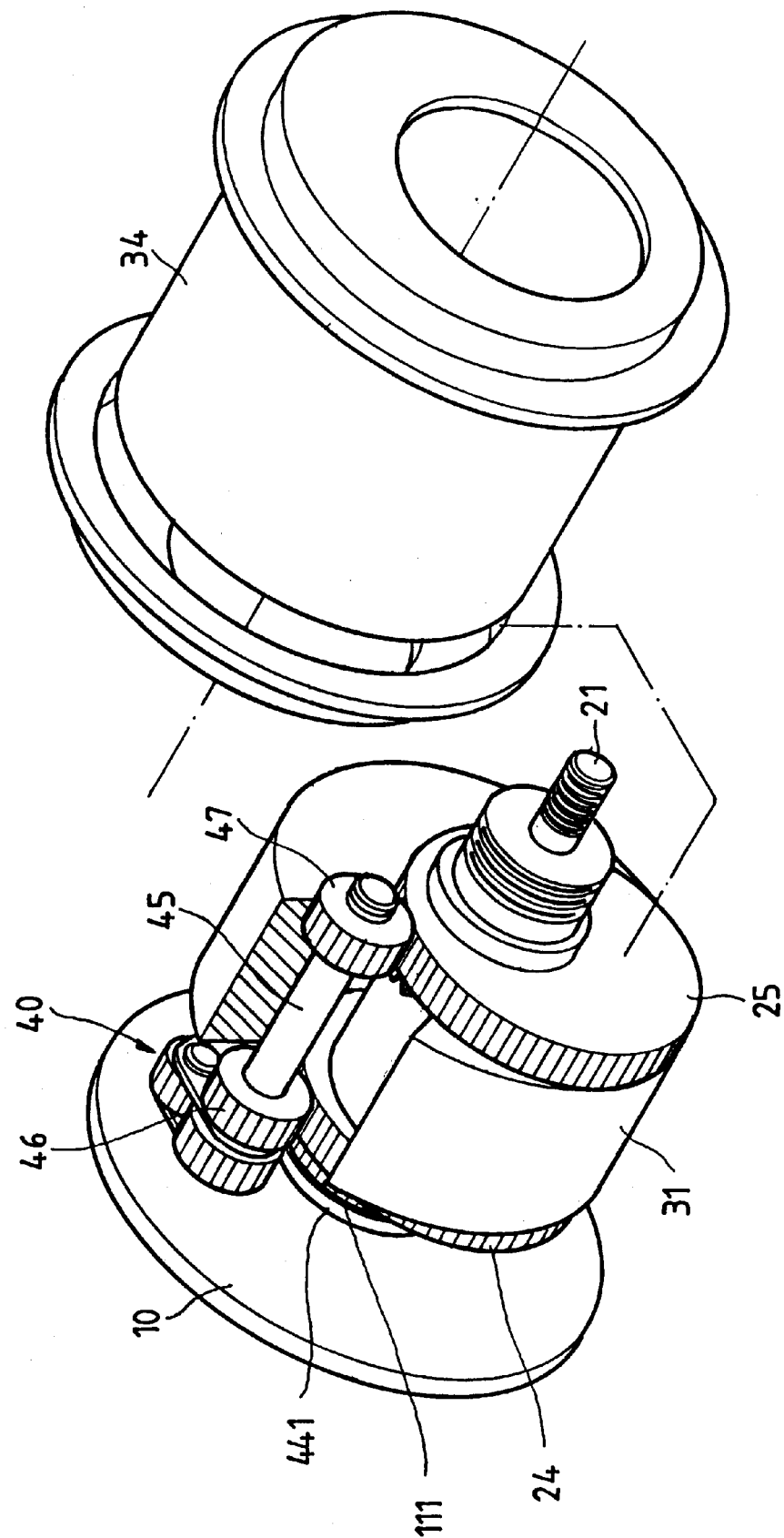

An enclosing hub 34 has a tubular configuration and defines a receiving space therein. The hub 31, the eccentric gears 24, 25 and the transmission gears set 40 can be suitably assembled therein. As shown in FIG. 1B, the enclosing hub 34 is also provided with a plurality of spoke sockets in which the spokes of a wheel can be fixedly assembled thereof.

The transmission gears set 40 includes a first, second and third pinions 42, 43 and 44 that are interconnected by means of a pair of supporting brackets 41. Each of those pinions 42, 43 and 44 is mounted to the supporting bracket 41 as will be described. Those pinions 42, 43 and 44 are mounted such that those pinions are meshed with each other. The third pinion 44 is engaged with the outer threaded portion 111 of the bushing 11 of the braking disk 10. The second pinion 42 of the transmission gears set 40 is pivotally mounted with a transmission rod 45 that passes through the driving hole 33 of the hub 31. First holder plate 441 and second holder plate 442 is used to fix the transmission gears set 40 to the braking disk 10 and inner sleeve 23. With respect to the positioning of pinion 42, 43, and 44, the gear shaft 411 and axle sleeve 412 are shown in FIG. 1A. Pinion 42 is coupled to supporting brackets 41 by the transmission rod 45; pinion 43 is coupled to supporting bracket 41 by gear shaft 411 and axle sleeve 412; the position of pinion 44 is achieved in same manner as pinion 43, i.e. pinion 44 is coupled to supporting brackets 41 by another set of gear shaft and axle sleeve. Gear shaft 411 is inserted through a hole at member 442, and members 41, pinion 44, and member 441 and then fastened at the axial sleeve. A pair of driving gears 46 and 47 are disposed and engaged respectively with the inner and outer eccentric gears 24, 25. Both end of the transmission rod 45 is further mounted with a C-shape retainer 48 to prevent the deviation of the gears.

The eccentric device can be operated at a normal position and an eccentric position and it will be detailed described as below.

Figure 2:
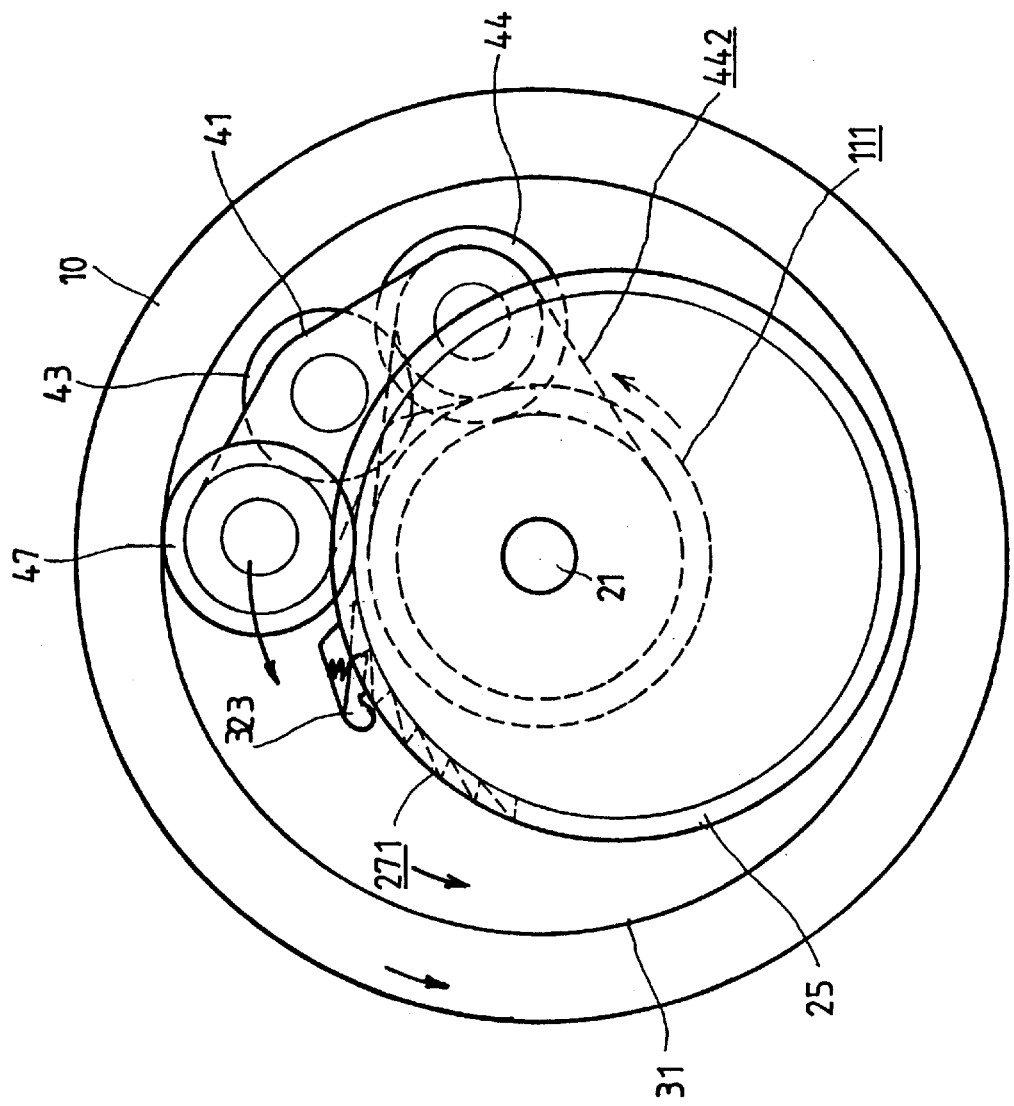
FIG. 2 is schematic illustration of the operation of the gear set made according to the present invention.
Figure 3:
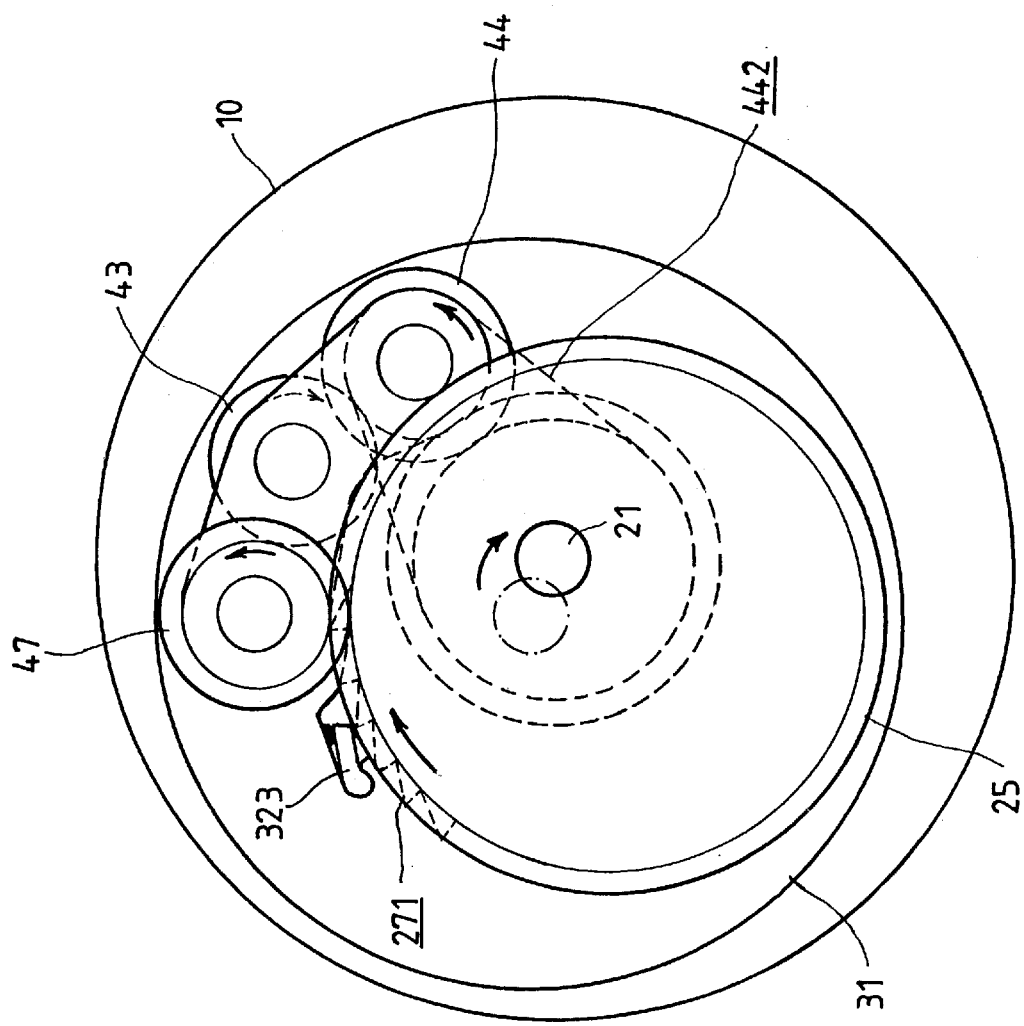
FIG. 3 is still a schematic illustration of the operation of the gear set in which the eccentric device has rotated to another position.

Referring to FIG. 2, the main shaft 21 located at a beginning position and which is in the center of the hub 31. When the pedal (not shown) of the bicycle is stepped down to rotate the flywheel 22 forward, the inner sleeve 23 and the inner eccentric gear 24 is also rotated forward. Meanwhile, the driving gear 46 is also rotated and the other driving gear 47 is rotated by the transmission rod 45. As a result, the outer eccentric gear 25 is also rotated in the same direction. Since the ratchet 271 of the ratchet wheel 27 that is attached to the outer eccentric gear 25 is engaged with the biasing tab 323 of the hub 31, the transmission gears sets 40 are not able to rotate. Accordingly, the hub 31 will be rotated simultaneously by means of the transmission rod 45. On the other hand, the first pinion 42 located at the tail portion of the driving gear 46 is also rotated by the transmission rod 45. With the dragging of the supporting bracket 41, the third pinion 44 is also rotated. Besides, the braking disk 10 is also rotated in the same direction by the teeth 111 of the bushing 11. However, as the main shaft 21 is located at the center of the hub 31, the enclosing hub 34 can be rotated in the same direction. As a result, the rear wheel that attached to the enclosing hub 34 is rotated forward. In this case, the enclosing hub 34 functions as normal.

The eccentric device is operated at eccentric position. The eccentric position shall be firstly adjusted. The braking disk 10 shall be firstly braked by means of a brake. The brake is used to stop the braking disk 10 and which is irrelevant to the present invention. It has nothing to do with the present invention and no detailed description is given.

When the braking disk 10 is stopped, the third pinion 44 is just engaged with the teeth 111 of the bushing 11. As a result, the third pinion 44 is forcibly rotated around the bushing 11. Meanwhile, the driving gear 46 is also rotated by the third pinion 44 through the first pinion 42. In this case, the outer eccentric gear 25 is rotated counterclockwise by the driving gears 46 and 47. Then the ratchet wheel 27 is also rotated counterclockwise respect to the hub 31 and the ratchet 271 is slid over the biasing tab 323. As a result, a shifting displacement is attained.

Figure 4A:
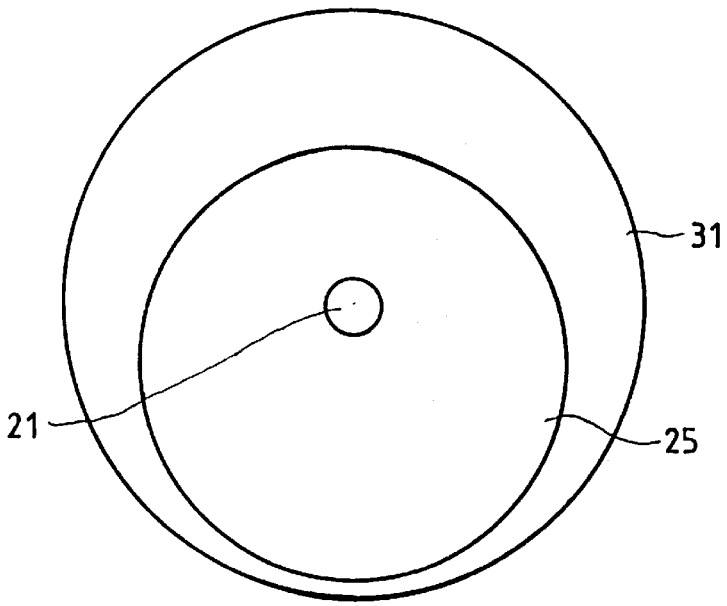
FIGS. 4A and 4B are the schematic illustration views of the cam device.
Figure 4B:
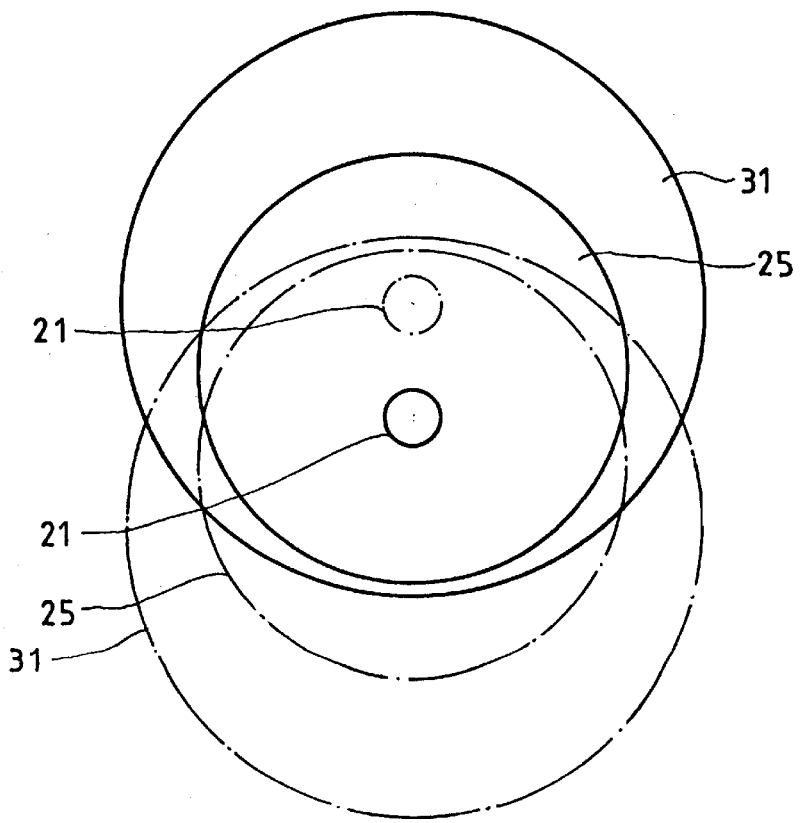

The shifting displacement of the main shaft 21 after it is shifted plus the shifting displacement of the eccentric gear 25 with respect to the original position of the main shaft 21, is clearly shown in FIGS. 4A and 4B. In light of this, by assembling the hub 31 and the eccentric gears 24 and 25 with different sizes, a variety of shifting displacement for different bicycle can be attained. On the other hand, the shifting displacement is also dependent to the rotating time of the ratchet wheel 27 respect to the hub 31. That is, the interval between the braking disk 10 is braked and released.

When the braking disk 10 is released, the pedal can be stepped down and the flywheel 22 is rotated. In this case, the eccentric gears 24, 25 may continue to rotate the hub 31, the enclosing hub 34 and the rear wheel. In this case, the rear wheel is rotated in an eccentric manner and the user can get an exercise from this movement.

If the user hopes to ride the bicycle normally, he/she may brake the braking disk 10 firstly and then to reset the shifting such that the main shaft 21 is returned to the center position of the hub 31.

On the other hand, the present invention can be also provided with suitable controlling device to control the oscillating amplitude of the wheel in a step-by-step manner.

By the provision of the present invention, the bicycle can be operated at a normal mode or a shifted mode that provides an entertaining and exercising result. This is really a brand new device and a patent is requested to grant.

I claim:

1. An eccentric device for the gear set of a bicycle, comprising a braking disk having a round shape, a bushing being fixedly locked to the center of said braking disk, said bushing having a smooth inner surface and an inner sleeve being rotationally mounted therein;

an eccentric shafts set including:

a main shaft with having as components a flywheel, an inner sleeve, an inner eccentric gear, a hub, an external eccentric gear, and an outer sleeve, each of said components being rotationally movable about said main shaft;

one end of said outer sleeve being fixedly attached to a ratchet wheel and said outer sleeve being extended through said external eccentric gear;

wherein said inner sleeve being locked between said flywheel wheel and said inner eccentric gear, said outer sleeve being locked at the eccentric sleeve of said ratchet wheel;

a hub assembly being provided and including:
- a hub having an eccentric hole, a driving hole, and a recess along the peripheral of said eccentric hole, a spring and biasing tab being disposed, thereon wherein said biasing tab is engagable with a ratchet provided at the perimeter of said ratchet wheel and said hub can be rotated in only one direction;
- an enclosing hub having a tubular configuration and defining a receiving space therein, said hub, said eccentric gears and a transmission gears set being assembled therein,
- said transmission gears set including first, second and third pinions interconnected by means of a pair of supporting brackets, each of said pinions being mounted on the supporting, brackets said pinions being mounted such that said pinions are meshed with each other, said third pinion being engaged with an outer threaded portion of said bushing which is fixedly attached to said braking disk, said second gear of said transmission gears set being pivotally mounted with a transmission rod passing through said driving hole of said hub, a pair of driving gears being disposed and engaged respectively with said inner and outer eccentric gears, and mounted on opposite ends of said transmission rod;

wherein when said braking disk is stopped, said third pinion is forcibly rotated around said bushing and said outer eccentric gear is rotated counterclockwise by said driving gears, said ratchet wheel being also rotated counterclockwise respect to said hub, and a shifting displacement is attained, wherein the shifting displacement can be readily controlled by said braking disk.

* * * * *